US008860903B2

United States Patent
Zhang

(10) Patent No.: US 8,860,903 B2
(45) Date of Patent: Oct. 14, 2014

(54) LIQUID CRYSTAL DISPLAY DEVICE

(71) Applicant: Shenzhen China Star Optoelectronics Technology Co., LTD., Shenzhen (CN)

(72) Inventor: Yanxue Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 188 days.

(21) Appl. No.: 13/806,772

(22) PCT Filed: Nov. 19, 2012

(86) PCT No.: PCT/CN2012/084796
§ 371 (c)(1),
(2), (4) Date: Dec. 22, 2012

(87) PCT Pub. No.: WO2014/067181
PCT Pub. Date: May 8, 2014

(65) Prior Publication Data
US 2014/0118660 A1    May 1, 2014

(51) Int. Cl.
*G02F 1/1333* (2006.01)
(52) U.S. Cl.
CPC .................. *G02F 1/133308* (2013.01)
USPC ............................................... 349/58
(58) Field of Classification Search
USPC ............................................... 349/58
See application file for complete search history.

(56) References Cited

U.S. PATENT DOCUMENTS

| 7,271,861 | B2 * | 9/2007 | Yamazaki ........................ 349/58 |
| 7,557,869 | B2 * | 7/2009 | Bang et al. ...................... 349/12 |
| 7,580,090 | B2 * | 8/2009 | Choi ................................ 349/58 |
| 8,537,300 | B2 * | 9/2013 | Toriyama et al. ............... 349/58 |
| 8,625,046 | B2 * | 1/2014 | Zhang et al. .................... 349/58 |
| 8,773,617 | B2 * | 7/2014 | Choi et al. ...................... 349/65 |
| 2009/0141209 | A1 * | 6/2009 | Chen et al. ...................... 349/58 |

FOREIGN PATENT DOCUMENTS

| CN | 1940653 A | 4/2007 |
| CN | 101667373 A | 3/2010 |
| CN | 102566106 A | 7/2012 |
| JP | 2004-233501 A | 8/2004 |
| JP | 2008-102173 A | 5/2008 |
| KR | 10-2007-0117054 A | 12/2007 |
| TW | 557389 | 10/2003 |

* cited by examiner

*Primary Examiner* — James Dudek
(74) *Attorney, Agent, or Firm* — Cheng-Ju Chiang

(57) ABSTRACT

The present invention provides a liquid crystal display device, which includes a backlight module, a backlight module, a mold frame arranged on the backlight module, a liquid crystal display panel arranged on the mold frame, and a front enclosure arranged on the liquid crystal display panel. The backlight module includes a backplane, a backlight source mounted in the backplane, and a light guide plate received in the backplane. The backplane is made of a conductive material and has a bottom board and side boards connected to the bottom board. At least one of the side boards forms protrusions projecting outward from an outside surface thereof. The front enclosure has an inside surface opposing said one of the side boards and including a conductive film mounted thereto and having an end in contact engagement with the liquid crystal display panel and an opposite end in contact engagement with the protrusions.

11 Claims, 5 Drawing Sheets

LIQUID CRYSTAL DISPLAY DEVICE

BACKGROUND OF THE INVENTION

1. Field of the Invention

The present invention relates to the field of liquid crystal displaying, and in particular to a liquid crystal display device.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel pieces of glass and a plurality of vertical and horizontal fine electrical wires is arranged between the two pieces of glass, whereby the liquid crystal molecules are controlled to change direction by application of electricity in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and is projected out through a light emergence face of the light guide plate, after being reflected and diffused, to thereby form a planar light source for the liquid crystal panel.

Referring to FIG. 1, a liquid crystal display device generally comprises a backlight module 100, a mold frame 300 arranged on the backlight module 100, a liquid crystal display panel 500 arranged on the mold frame 300, and a front enclosure 700 arranged on the liquid crystal display panel 500. The backlight module 100 comprises a backplane 102, a light guide plate 104 received in the backplane 100, and a backlight source (not shown) mounted in the backplane 102. The backlight module 100 provides the liquid crystal display panel 500 with a planar light source of homogenous illumination. The mold frame 300 supports the liquid crystal display panel 500 and the front enclosure 700 retains the liquid crystal display panel 500 in the mold frame 300. The liquid crystal display panel 500 comprises a TFT (Thin-Film Transistor) substrate 502, a CF (Color Filter) substrate 504 that is set opposite to and laminated on the TFT substrate 502, and liquid crystal (not shown) interposed between the TFT substrate 502 and the CF substrate 504. The TFT substrate 502 is laminated on the CF substrate 504 in such a way that a stepped site 524 is formed at an edge of the TFT substrate 502. The stepped site 524 functions to receive a flexible circuit board (such as chip-on-flex, COF) 526 thereon for supplying a drive voltage to the liquid crystal display panel 500.

The front enclosure 700 is generally made of plastics for cost control purposes. The backplane 102 is generally made of metals, such as steel, to ensure strength of the backlight module 100. A liquid crystal display device of such a structure is susceptible to being not able to release static electricity generated by the flexible circuit board 526, resulting in the risk of electrostatics breakthrough of the flexible circuit board 526 and integrated circuits (not shown) and thus affecting the quality of the liquid crystal display device.

To cope with the problem, Chinese Patent Application (No. 201210068995.6) discloses a liquid crystal display device (as shown in FIG. 2), which comprises, sequentially from outer side to inner side, a front enclosure 100', a mold frame 300', and a backplane 500' that are combined with each other. The front enclosure 100' and the mold frame 300' interpose therebetween a liquid crystal panel 700'. The front enclosure 100' is made of an insulation material and a conductive film 102' is arranged on a surface of the front enclosure 100'. The backplane 500' is made of a conductive material and a conductor piece 502' is provided between the conductive film 102' and the backplane 500', so that the conductive film 102' is electrically connected, via the conductor piece 502', to the backplane 500'. This arrangement uses the connection between the conductive film 102' and the backplane 500' that is made of a conductive material established with the conductor piece 502' so that static electricity generated by a flexible circuit board (not shown) is discharged through the conductive film 102' to the backplane 500' to effectively protect the circuit board and integrated circuits from electrostatic breakthrough.

This solution effectively handles the issue of releasing static electricity but suffers the following drawbacks:

(1) The conductor piece that connects the front enclosure with the backplane lowers down the cost advantage of the plastics-made front enclosure.

(2) Bonding the conductor piece causes a waste of labor cost.

(3) The bonded conductor piece may get inadvertently detached and quality problems may result.

SUMMARY OF THE INVENTION

An object of the present invention is to provide a liquid crystal display device, which can effectively release static electricity, has an extended lifespan, has a simple structure, is easy to assemble, and is advantageous for cost control.

To achieve the above object, the present invention provides a liquid crystal display device, which comprises a backlight module, a mold frame arranged on the backlight module, a liquid crystal display panel arranged on the mold frame, and a front enclosure arranged on the liquid crystal display panel. The backlight module comprises a backplane, a backlight source mounted in the backplane, and a light guide plate received in the backplane. The backplane is made of a conductive material. The backplane comprises a bottom board and a plurality of side boards connected to the bottom board. At least one of the side boards forms a plurality of protrusions projecting outward from an outside surface thereof. The front enclosure has an inside surface opposing said one of the side boards and comprising a conductive film mounted thereto. The conductive film has an end that is set in contact engagement with the liquid crystal display panel and an opposite end in contact engagement with the protrusions.

The mold frame is made of a plastic material and forms openings corresponding to the protrusions. The protrusions are allowed to extend through the openings to abut the conductive film.

The mold frame comprises a bearing section corresponding to the liquid crystal display panel and the liquid crystal display panel is born on the bearing section.

The liquid crystal display panel comprises a TFT (Thin-Film Transistor) substrate, a CF (Color Filter) substrate opposite to and laminated on the TFT substrate, and liquid crystal interposed between the TFT substrate and the CF substrate.

The TFT substrate and the CF substrate are laminated to each other in such a way that a stepped site is formed at an edge of the CF substrate. A flexible circuit board is bonded to the stepped site. The flexible circuit board supplies a drive voltage to the liquid crystal display panel.

The liquid crystal display panel comprises a first polarizer laminated on a surface of the TFT substrate that is distant from the CF substrate and a second polarizer laminated to a surface of the CF substrate that is distant from the TFT substrate.

The front enclosure is made of a plastic material.

The conductive film comprises an electrically conductive aluminum foil.

The backlight module comprises a reflector plate arranged between the bottom and the light guide plate and an optic film assembly positioned on the light guide plate.

The liquid crystal display device further comprises a rear enclosure that mates the front enclosure.

The present invention also provides a liquid crystal display device, which comprises a backlight module, a mold frame arranged on the backlight module, a liquid crystal display panel arranged on the mold frame, and a front enclosure arranged on the liquid crystal display panel, the backlight module comprising a backplane, a backlight source mounted in the backplane, and a light guide plate received in the backplane, the backplane being made of a conductive material, the backplane comprising a bottom board and a plurality of side boards connected to the bottom board, at least one of the side boards forming a plurality of protrusions projecting outward from an outside surface thereof, the front enclosure having an inside surface opposing said one of the side boards and comprising a conductive film mounted thereto, the conductive film having an end that is set in contact engagement with the liquid crystal display panel and an opposite end in contact engagement with the protrusions;

wherein the mold frame is made of a plastic material and forms openings corresponding to the protrusions, the protrusions being allowed to extend through the openings to abut the conductive film;

wherein the mold frame comprises a bearing section corresponding to the liquid crystal display panel and the liquid crystal display panel is born on the bearing section;

wherein the liquid crystal display panel comprises a TFT substrate, a CF substrate opposite to and laminated on the TFT substrate, and liquid crystal interposed between the TFT substrate and the CF substrate;

wherein the TFT substrate and the CF substrate are laminated to each other in such a way that a stepped site is formed at an edge of the CF substrate, a flexible circuit board being bonded to the stepped site, the flexible circuit board providing a drive voltage to the liquid crystal display panel;

wherein the liquid crystal display panel comprises a first polarizer laminated on a surface of the TFT substrate that is distant from the CF substrate and a second polarizer laminated to a surface of the CF substrate that is distant from the TFT substrate;

wherein the front enclosure is made of a plastic material;

wherein the conductive film comprises an electrically conductive aluminum foil;

wherein the backlight module comprises a reflector plate arranged between the bottom and the light guide plate and an optic film assembly positioned on the light guide plate; and further comprising a rear enclosure that mates the front enclosure.

The efficacy of the present invention is that the liquid crystal display device according to the present invention provides protrusions on side boards of a backplane of a backlight module and sets a conductive film on a surface of a front enclosure in such a way that the conductive film has an end in contact engagement with a liquid crystal display panel and an opposite end in contact engagement with the protrusions so as to construct an electric path for effectively releasing static electricity and preventing static electricity from breaking through a flexible circuit board and integrated circuits to extend the lifespan of the liquid crystal display device. In addition, the structure is simple, the assembling is easy, and the manufacturing cost can be effectively reduced.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
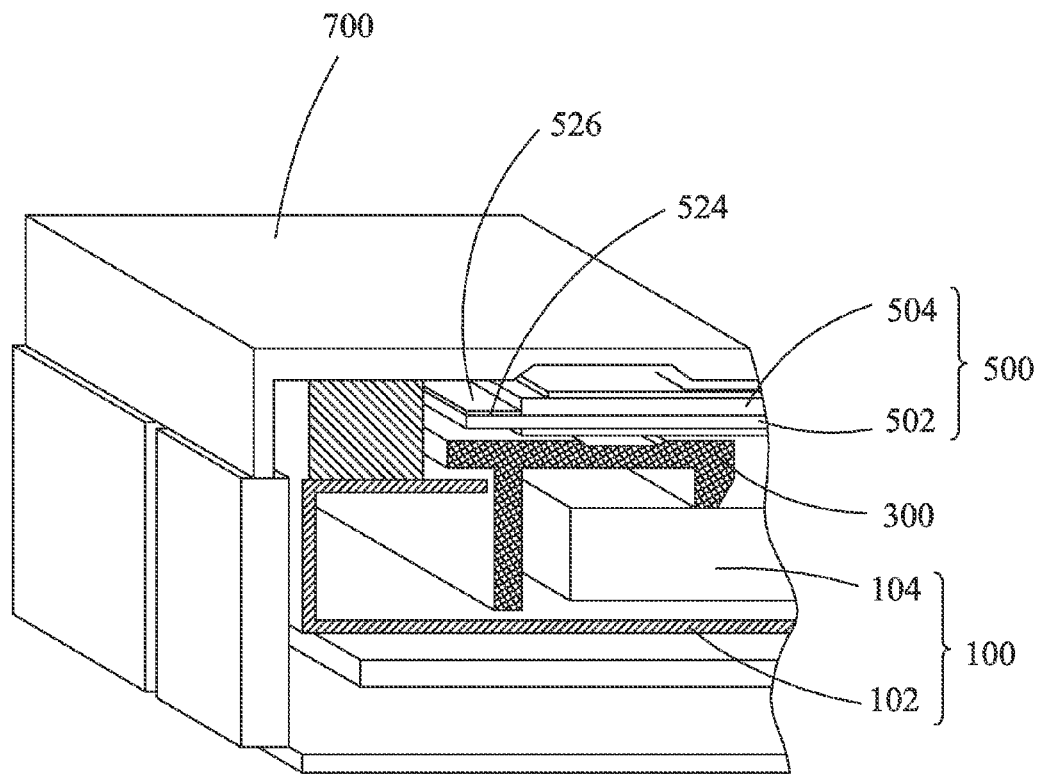
FIG. 1 is a schematic view showing the structure of a conventional liquid crystal display device.
Figure 2:
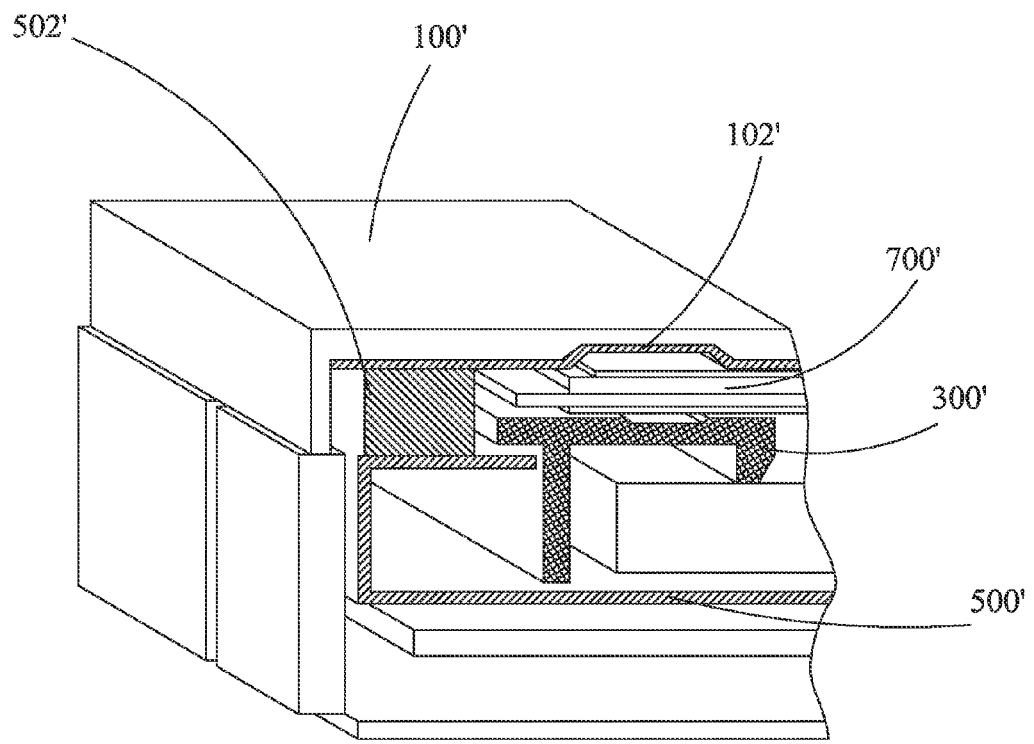
FIG. 2 is a schematic view showing the structure of another conventional liquid crystal display device.
Figure 3:
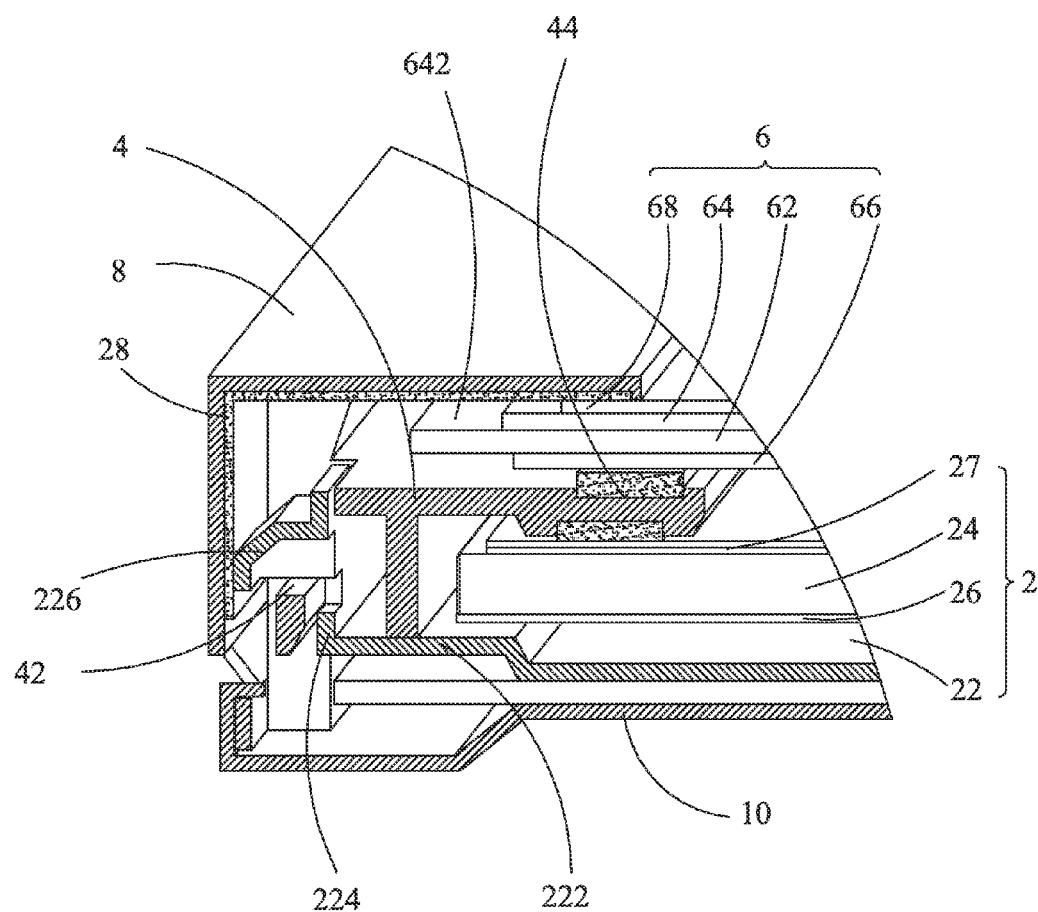
FIG. 3 is a schematic view showing the structure of a liquid crystal display device according to the present invention.
Figure 4:
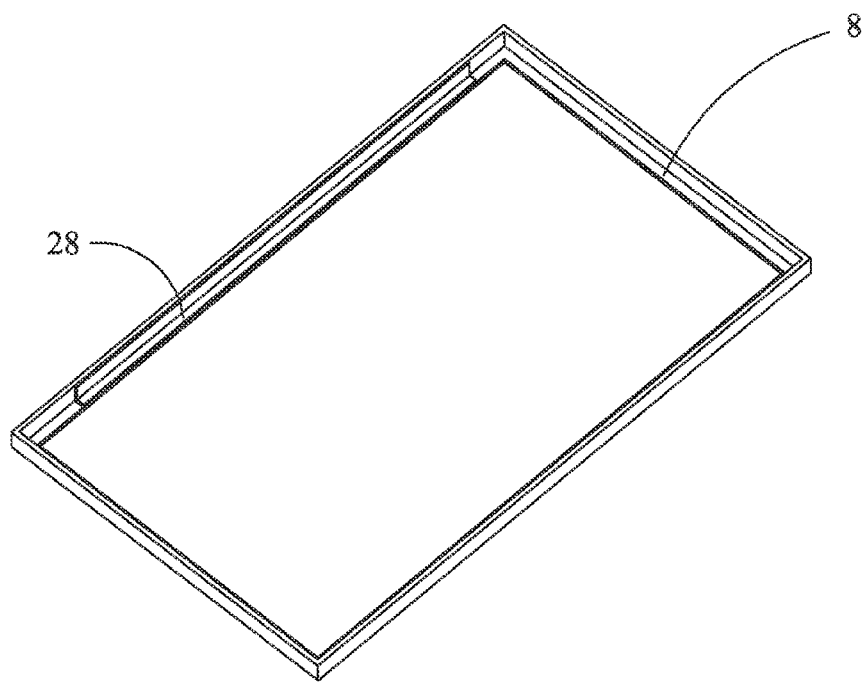
FIG. 4 is a schematic view showing assembling of a front enclosure and a conductive film of the liquid crystal display device according to the present invention.
Figure 5:
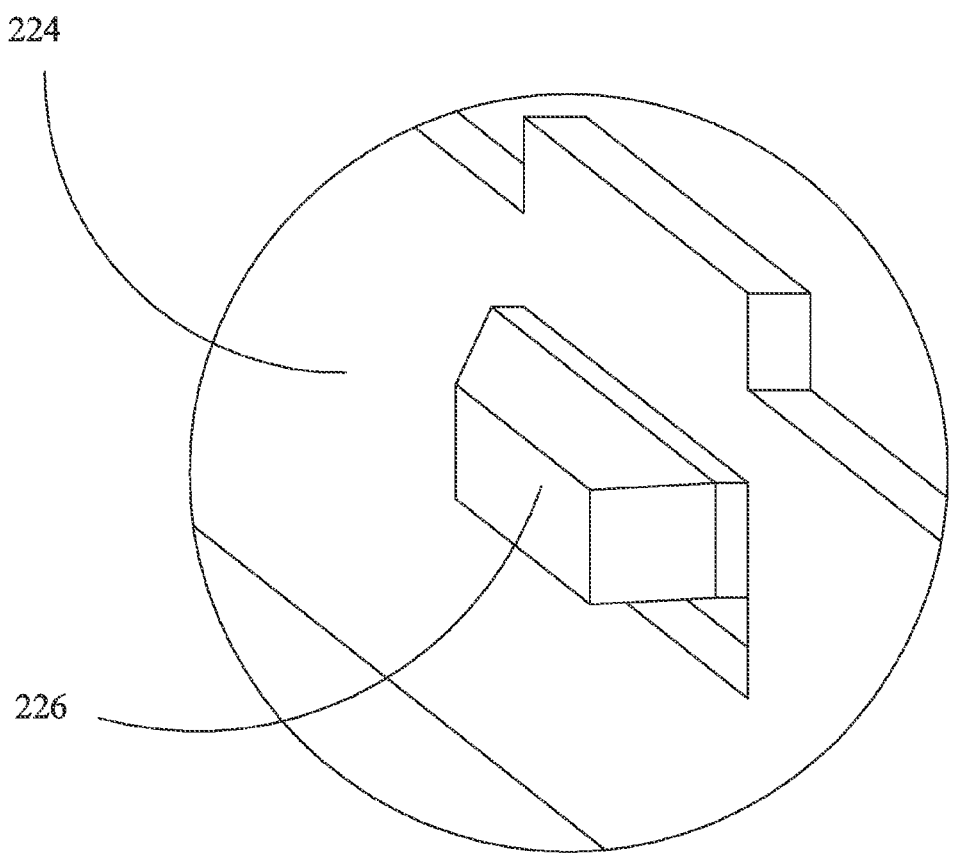
FIG. 5 is schematic view showing the structure of a protrusion on a backplane of the liquid crystal display device according to the present invention.

Referring to FIGS. 3-5, the present invention provides a liquid crystal display device, which comprises a backlight module 2, a mold frame 4 arranged on the backlight module 2, a liquid crystal display panel 6 arranged on the mold frame 4, and a front enclosure 8 arranged on the liquid crystal display panel 6.

The backlight module 2 comprises a backplane 22, a backlight source (not shown) mounted in the backplane 22, and a light guide plate 24 received in the backplane 22. The backplane 22 is made of a conductive material. The backplane 22 comprises a bottom board 222 and a plurality of side boards 224 connected to the bottom board 222. At least one of the side boards 224 forms a plurality of protrusions 226 projecting outward from an outside surface thereof. The front enclosure 8 is made of a plastic material and has an inside surface opposing said one of the side boards 224 and comprises a conductive film 28 mounted thereto. In the instant embodiment, the conductive film 28 is an electrically conducive aluminum foil. The conductive film 28 has an end that is set in contact engagement with the liquid crystal display panel 6 and an opposite end in contact engagement with the protrusions 226 to form an electrical path for releasing static electricity and thus effectively protecting a flexible circuit board (not shown) and integrated circuits (not shown).

The mold frame 4 is made of a plastic material and forms openings 42 corresponding to the protrusions 226. The protrusions 226 are allowed to extend through the openings 42 to abut the conductive film 28. The mold frame 4 comprises a bearing section 44 corresponding to the liquid crystal display panel 6 and the liquid crystal display panel 6 is born on the bearing section 44.

The liquid crystal display panel 6 comprises a TFT substrate 62, a CF substrate 64 opposite to and laminated on the TFT substrate 62, and liquid crystal (not shown) interposed between the TFT substrate 62 and the CF substrate 64.

The TFT substrate 62 and the CF substrate 64 are laminated to each other in such a way that a stepped site 642 is formed at an edge of the CF substrate 64. A flexible circuit board (not shown) is bonded to the stepped site 642. The flexible circuit board provides a drive voltage to the liquid crystal display panel 6 to drive liquid crystal molecules for effecting displaying of images.

The liquid crystal display panel 6 further comprises a first polarizer 66 that is laminated on a surface of the TFT substrate 62 that is distant from the CF substrate 64 and a second polarizer 68 laminated to a surface of the CF substrate 64 that is distant from the TFT substrate 62.

The backlight module 2 further comprises a reflector plate 26 arranged between the bottom board 222 and the light guide plate 24 and an optic film assembly 27 positioned on the light guide plate 24. The backlight source emits light that directly enters or is reflected by the reflector plate 26 to get into the light guide plate 24. The light propagates in the light guide plate 24 to form a planar light source of homogeneous illumination to the liquid crystal display panel 6.

The liquid crystal display device of the present invention further comprises a rear enclosure 10 that mates the front enclosure 8. In the instant embodiment, the front enclosure 8 are coupled to the rear enclosure 10 through snap fitting to thereby retain the backlight module 2, the mold frame 4, and the liquid crystal display panel 6 between the front enclosure 8 and the rear enclosure 10 to form the liquid crystal display device.

In summary, the liquid crystal display device according to the present invention provides protrusions on side boards of a backplane of a backlight module and sets a conductive film on a surface of a front enclosure in such a way that the conductive film has an end in contact engagement with a liquid crystal display panel and an opposite end in contact engagement with the protrusions so as to construct an electric path for effectively releasing static electricity and preventing static electricity from breaking through a flexible circuit board and integrated circuits to extend the lifespan of the liquid crystal display device. In addition, the structure is simple, the assembling is easy, and the manufacturing cost can be effectively reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising a backlight module, a mold frame arranged on the backlight module, a liquid crystal display panel arranged on the mold frame, and a front enclosure arranged on the liquid crystal display panel, the backlight module comprising a backplane, a backlight source mounted in the backplane, and a light guide plate received in the backplane, the backplane being made of a conductive material, the backplane comprising a bottom board and a plurality of side boards connected to the bottom board, at least one of the side boards forming a plurality of protrusions projecting outward from an outside surface thereof, the front enclosure having an inside surface opposing said one of the side boards and comprising a conductive film mounted thereto, the conductive film having an end that is set in contact engagement with the liquid crystal display panel and an opposite end in contact engagement with the protrusions.

2. The liquid crystal display device as claimed in claim 1, wherein the mold frame is made of a plastic material and forms openings corresponding to the protrusions, the protrusions being allowed to extend through the openings to abut the conductive film.

3. The liquid crystal display device as claimed in claim 2, wherein the mold frame comprises a bearing section corresponding to the liquid crystal display panel and the liquid crystal display panel is born on the bearing section.

4. The liquid crystal display device as claimed in claim 1, wherein the liquid crystal display panel comprises a TFT substrate, a CF substrate opposite to and laminated on the TFT substrate, and liquid crystal interposed between the TFT substrate and the CF substrate.

5. The liquid crystal display device as claimed in claim 4, wherein the TFT substrate and the CF substrate are laminated to each other in such a way that a stepped site is formed at an edge of the CF substrate, a flexible circuit board being bonded to the stepped site, the flexible circuit board supplying a drive voltage to the liquid crystal display panel.

6. The liquid crystal display device as claimed in claim 4, wherein the liquid crystal display panel comprises a first polarizer laminated on a surface of the TFT substrate that is distant from the CF substrate and a second polarizer laminated to a surface of the CF substrate that is distant from the TFT substrate.

7. The liquid crystal display device as claimed in claim 1, wherein the front enclosure is made of a plastic material.

8. The liquid crystal display device as claimed in claim 1, wherein the conductive film comprises an electrically conductive aluminum foil.

9. The liquid crystal display device as claimed in claim 1, wherein the backlight module comprises a reflector plate arranged between the bottom and the light guide plate and an optic film assembly positioned on the light guide plate.

10. The liquid crystal display device as claimed in claim 1, further comprising a rear enclosure that mates the front enclosure.

11. A liquid crystal display device, comprising a backlight module, a mold frame arranged on the backlight module, a liquid crystal display panel arranged on the mold frame, and a front enclosure arranged on the liquid crystal display panel, the backlight module comprising a backplane, a backlight source mounted in the backplane, and a light guide plate received in the backplane, the backplane being made of a conductive material, the backplane comprising a bottom board and a plurality of side boards connected to the bottom board, at least one of the side boards forming a plurality of protrusions projecting outward from an outside surface thereof, the front enclosure having an inside surface opposing said one of the side boards and comprising a conductive film mounted thereto, the conductive film having an end that is set in contact engagement with the liquid crystal display panel and an opposite end in contact engagement with the protrusions;

wherein the mold frame is made of a plastic material and forms openings corresponding to the protrusions, the protrusions being allowed to extend through the openings to abut the conductive film;

wherein the mold frame comprises a bearing section corresponding to the liquid crystal display panel and the liquid crystal display panel is born on the bearing section;

wherein the liquid crystal display panel comprises a TFT substrate, a CF substrate opposite to and laminated on the TFT substrate, and liquid crystal interposed between the TFT substrate and the CF substrate;

wherein the TFT substrate and the CF substrate are laminated to each other in such a way that a stepped site is formed at an edge of the CF substrate, a flexible circuit board being bonded to the stepped site, the flexible circuit board providing a drive voltage to the liquid crystal display panel;

wherein the liquid crystal display panel comprises a first polarizer laminated on a surface of the TFT substrate that is distant from the CF substrate and a second polarizer laminated to a surface of the CF substrate that is distant from the TFT substrate;

wherein the front enclosure is made of a plastic material;

wherein the conductive film comprises an electrically conductive aluminum foil;

wherein the backlight module comprises a reflector plate arranged between the bottom and the light guide plate and an optic film assembly positioned on the light guide plate; and further comprising a rear enclosure that mates the front enclosure.

\* \* \* \* \*